United States Patent
Abe et al.

(10) Patent No.: US 8,896,994 B2
(45) Date of Patent: Nov. 25, 2014

(54) ELECTRONIC DEVICE WITH SECURING MECHANISM FOR SECURING A DISPLAY OF THE ELECTRONIC DEVICE

(75) Inventors: Takashi Abe, Kawasaki (JP); Daisuke Mihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 181 days.

(21) Appl. No.: 13/297,848

(22) Filed: Nov. 16, 2011

(65) Prior Publication Data

US 2012/0250284 A1    Oct. 4, 2012

(30) Foreign Application Priority Data

Mar. 30, 2011   (JP) ................................ 2011-076339

(51) Int. Cl.
*H05K 5/00*   (2006.01)
*G06F 1/16*   (2006.01)

(52) U.S. Cl.
CPC .............. *G06F 1/162* (2013.01); *G06F 1/1637* (2013.01)
USPC ............ 361/679.21; 361/679.22; 361/679.27; 361/807; 349/58; 349/60

(58) Field of Classification Search
CPC ............................ G02F 1/133608; G06F 1/162
See application file for complete search history.

(56) References Cited

U.S. PATENT DOCUMENTS

| | | | |
|---|---|---|---|
| 5,550,712 A * | 8/1996 | Crockett | 361/752 |
| 5,579,036 A * | 11/1996 | Yates, IV | 345/173 |
| 5,831,816 A * | 11/1998 | Johns et al. | 361/679.21 |
| 6,532,152 B1 * | 3/2003 | White et al. | 361/692 |
| 7,173,678 B2 | 2/2007 | Havelka et al. | |
| 2002/0064036 A1 * | 5/2002 | Yano et al. | 361/809 |
| 2003/0223187 A1 | 12/2003 | Tsao et al. | |
| 2006/0066769 A1 * | 3/2006 | Minaguchi et al. | 349/58 |
| 2012/0206895 A1 * | 8/2012 | Shirasaka et al. | 361/807 |

FOREIGN PATENT DOCUMENTS

| | | |
|---|---|---|
| EP | 1591870 | 11/2005 |
| JP | 3-292523 A | 12/1991 |
| JP | 9-115378 A | 5/1997 |
| JP | 2001-311937 | 11/2001 |

OTHER PUBLICATIONS

"Extended European Search Report" mailed by EPO and corresponding to European Application No. EP 12152773.3 on Sep. 6, 2012.
JPOA—Japanese Office Action dated Aug. 12, 2014 issue for Japanese Patent Application No. 2011-076339 with full English translation.

* cited by examiner

*Primary Examiner* — Tuan T Dinh
*Assistant Examiner* — Steven T Sawyer
(74) *Attorney, Agent, or Firm* — Fujitsu Patent Center

(57) ABSTRACT

An electronic device includes: a chassis; an input device and a display panel that are arranged within the chassis; an elastic member that is arranged between the chassis and the display panel; and a holding member that holds the input device, that is secured to the chassis, and that pushes the display panel toward the elastic member to deform the elastic member.

5 Claims, 11 Drawing Sheets

ELECTRONIC DEVICE WITH SECURING MECHANISM FOR SECURING A DISPLAY OF THE ELECTRONIC DEVICE

CROSS-REFERENCE TO RELATED APPLICATIONS

This application is based upon and claims the benefit of priority of the prior Japanese Patent Application No. 2011-076339, filed on Mar. 30, 2011, the entire contents of which are incorporated herein by reference.

FIELD

The embodiments discussed herein are related to an electronic device.

BACKGROUND

There is known an electronic device equipped with a chassis, in which a touch panel and a display panel arranged. As an example of a method for securing the touch panel and the display panel to the chassis, a securing member is secured to the display panel and then secured to the chassis, and a holding member holding the touch panel is assembled into the display panel. The related art is disclosed in Japanese Laid-open Patent Publication Nos. 03-292523 and 09-115378.

Securing the touch panel and the display panel to the chassis needs both the holding member for holding the touch panel and the securing member for securing the display panel to the chassis. This may result in increased weight of the whole device.

SUMMARY

According to an aspect of the embodiments, an electronic device includes: a chassis; an input device and a display panel that are arranged within the chassis; an elastic member that is arranged between the chassis and the display panel; and a holding member that holds the input device, that is secured to the chassis, and that pushes the display panel toward the elastic member to deform the elastic member.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1A:
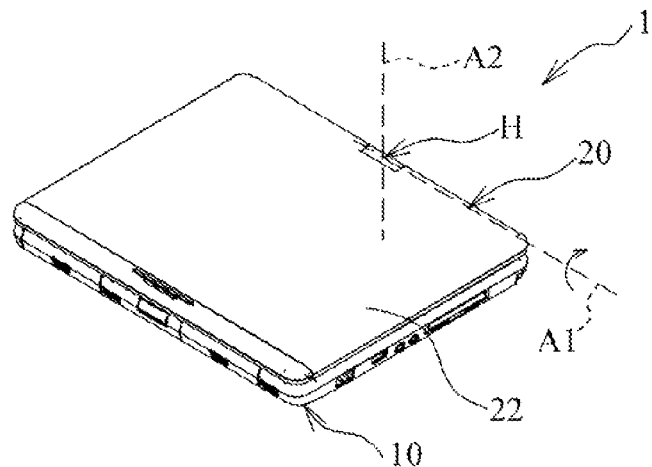
FIGS. 1A to 1C are explanatory views of a notebook computer according to a present embodiment.
Figure 1B:
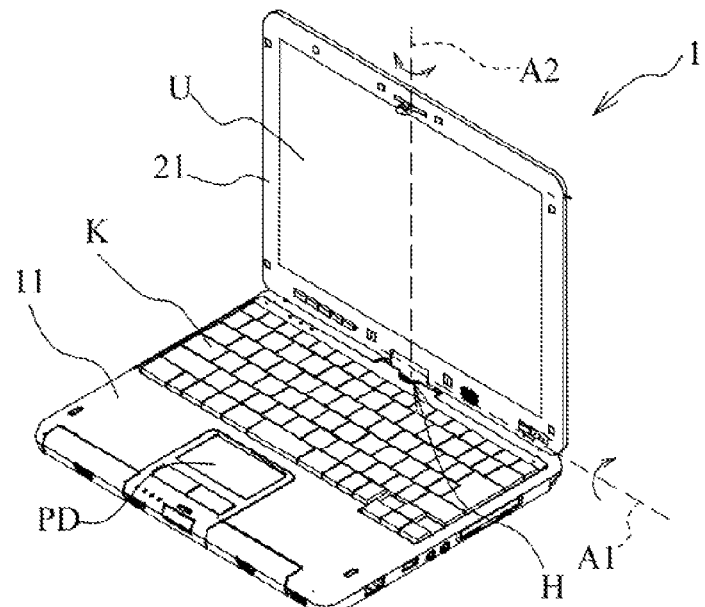
Figure 1C:
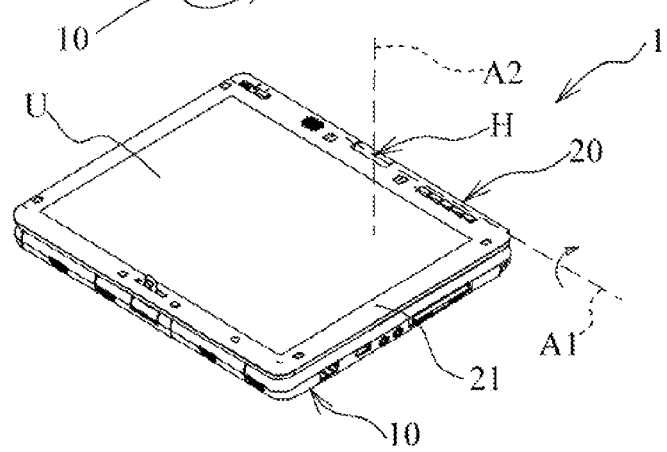

A description will be given of an exemplary notebook computer as an electronic device. FIGS. 1A to 1C are explanatory views of a notebook computer 1 according to the present embodiment. The notebook computer 1 has chassis 10 and 20. The chassis 10 and 20 are coupled by a two-axis hinge H. The chassis 10 includes a top surface 11 and a bottom surface opposite to the top surface 11. A keyboard K and a touch pad PD for operating the notebook computer 1 are provided on the top surface 11. A motherboard for controlling the whole operation of the notebook computer 1 is housed in the chassis 10. The chassis 20 includes a front surface 21 and a rear surface 22 opposite to the front surface 21. A display unit U is provided on the front surface 21. The display unit U includes: a display panel capable of displaying images; and an operable touch panel by touching the touch panel. Additionally, the touch panel may adopt various types such as a resistive type, a surface elastic wave type, and an infrared type. Further, the touch panel may adopt a capacitive type using a variation of a capacitance between a user's fingertip and a conductive layer without using a touch pen. Furthermore, the touch panel may adopt an electromagnetic induction pen tablet using an electronic pen instead of a touch panel. These touch panels and the pen tablet are examples of the input device. The two-axis hinge H couples the chassis 10 and 20 for rotation about two different central axes A1 and A2. The central axes A1 and A2 are perpendicular to each other. The central axis A1 virtually extends parallel to the direction in which the top surface 11 extends. The central axis A2 virtually extends in the direction intersecting the top surface 11. That is, the central axes A1 and A2 are intersected with each other.

FIG. 1A illustrates a first folded state where the front surface 21 of the chassis 20 overlaps the top surface 11 of the chassis 10. FIG. 1B illustrates an opened state where the chassis 10 and 20 are opened. FIG. 1C illustrates a second folded state where the rear surface 22 of the chassis 20 overlaps the top surface 11 of the chassis 10. A user rotates the chassis 20 about the central axis A1 from the first folded state, whereby the notebook computer 1 is in the opened state. The user rotates the chassis 20 about the central axis A2 from the opened state illustrated in FIG. 1B, whereby the front surface 21 and the rear surface 22 of the chassis 20 are reversed from the state illustrated in FIG. 1B. The user rotates the chassis 20 about the central axis A1 to overlap the chassis 10 with the front surface 21 and the rear surface 22 of the chassis 20 reversed. This enables the notebook computer 1 to be in the second folded state where the top surface 11 of the chassis 10 faces the rear surface 22 of the chassis 20.

Figure 2:
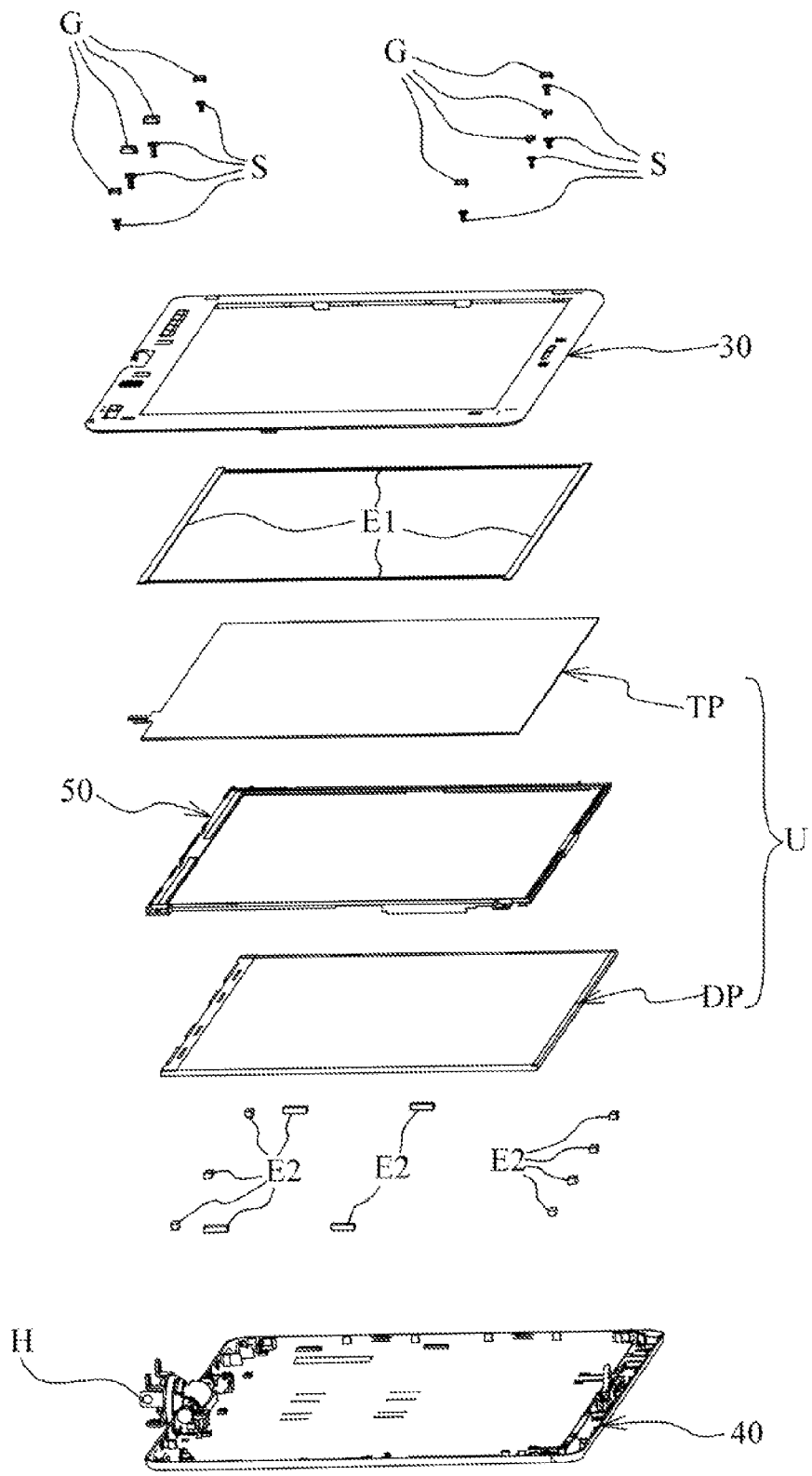
FIG. 2 is an exploded perspective view of a chassis.

FIG. 2 is an exploded perspective view of the chassis 20. The chassis 20 includes: covers 30 and 40; a holding member 50; and a display unit U. The holding member 50 and the display unit U are arranged within the covers 30 and 40. The covers 30 and 40 define the front surface 21 and the rear surface 22 of the chassis 20, respectively. The display unit U includes a touch panel TP and a display panel DP overlapping each other. The touch panel TP is arranged at the cover 30 side, whereas the display panel DP is arranged at the cover 40 side. The covers 30 and 40 are examples of first and second covers opposite to each other. The cover 30 has a frame shape in order to expose the touch panel TP and ensure visibility of the display panel DP. Sponges E1 are arranged between the cover 30 and the touch panel TP. Each of the sponges E1 linearly extends. The sponges E1 are attached to an inner side of the cover 30 with double-stick tapes or adhesive bonds. The sponges E1 are arranged along sides of the touch panel TP, respectively.

The holding member 50 holds the touch panel TP. The holding member 50 is made of a synthetic resin. Sponges E2 are arranged between the display panel DP and the cover 40. The sponges E2 are different in shape from one another, but may be the same. The sponges E2 are attached to an inner side of the cover 40 by double-stick tapes or adhesive bonds. The sponge E2 is an example of an elastic member arranged between the display panel DP and the chassis 10. The sponge E2 is also an example of a foam member.

Figure 3:
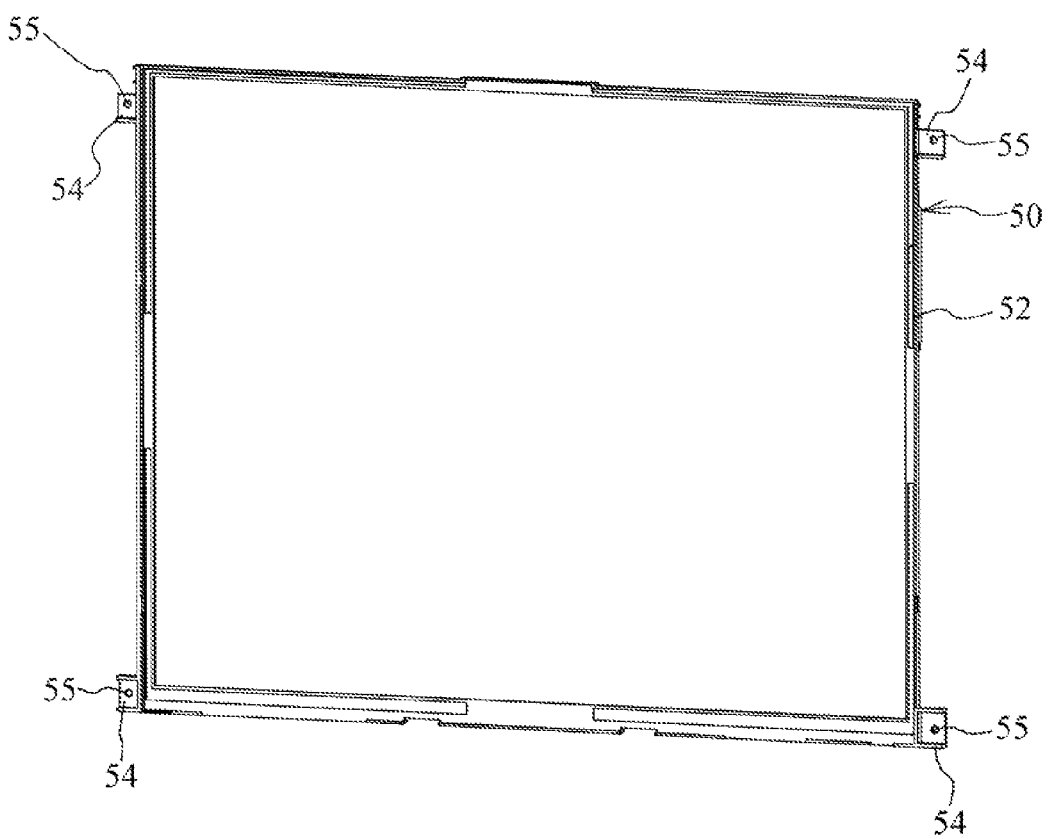
FIG. 3 is an external view of a holding member.

FIG. 3 is an external view of the holding member 50. The holding member 50 is made of a synthetic resin. The holding member 50 includes: a base portion 52 having a frame shape; projection portions 54 extends to the outside of the base portion 52; and through holes 55 respectively formed at the projection portions 54.

Figure 4:
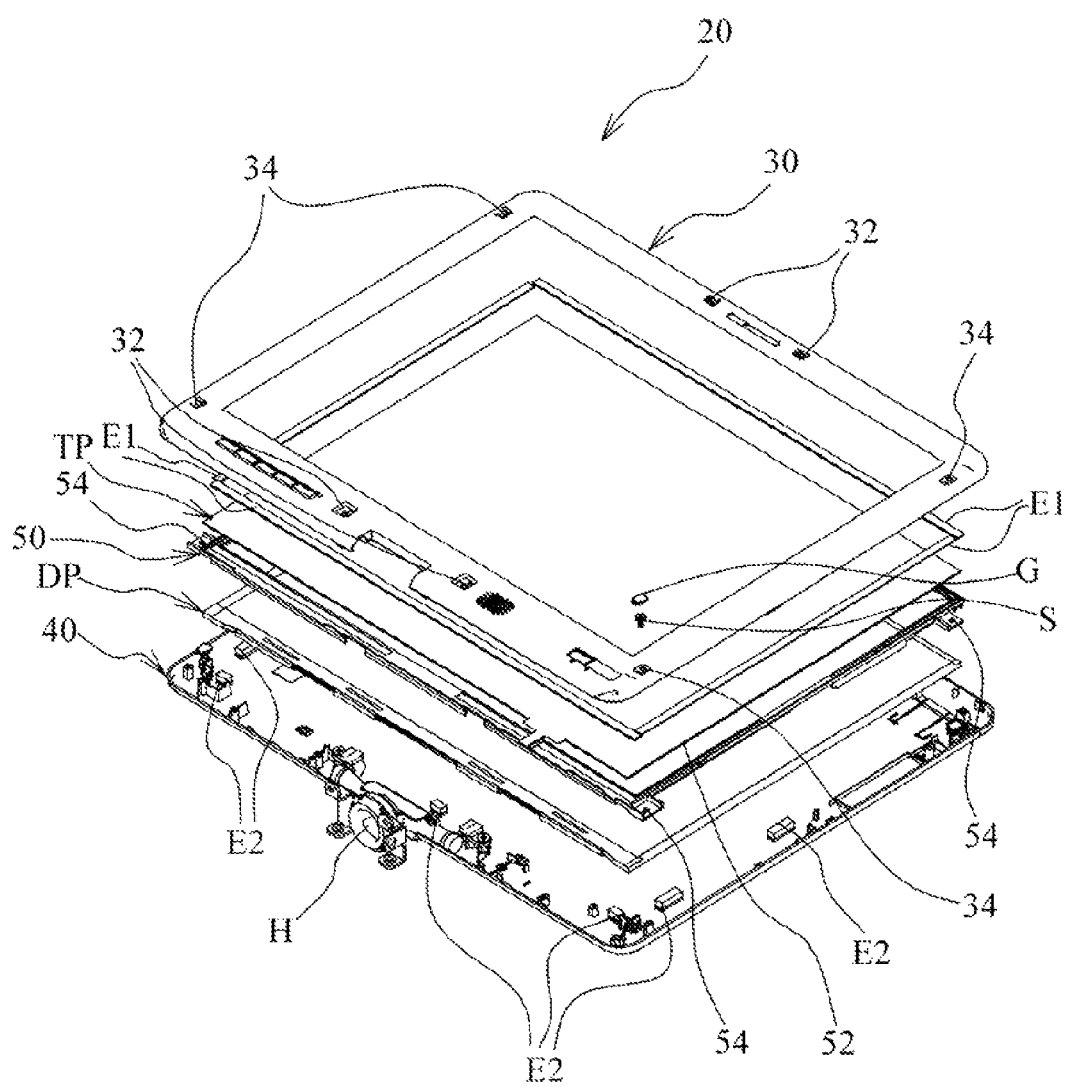
FIG. 4 is an exploded perspective view of the chassis.

FIG. 4 is an exploded perspective view of the chassis 20. As illustrated in FIG. 4, plural recess portions 32 and 34 are formed in the cover 30. The recess portions 32 and 34 have through holes through which screws S penetrate, respectively. The screws S penetrate the through holes and threadedly engages threaded holes of the cover 40, respectively. The recess portions 32 and 34 are fitted with rubbers G for covering the screws S, respectively. The rubbers G are different in shape from each other to correspond to the shapes of the recess portions 32 and 34.

Figure 5:
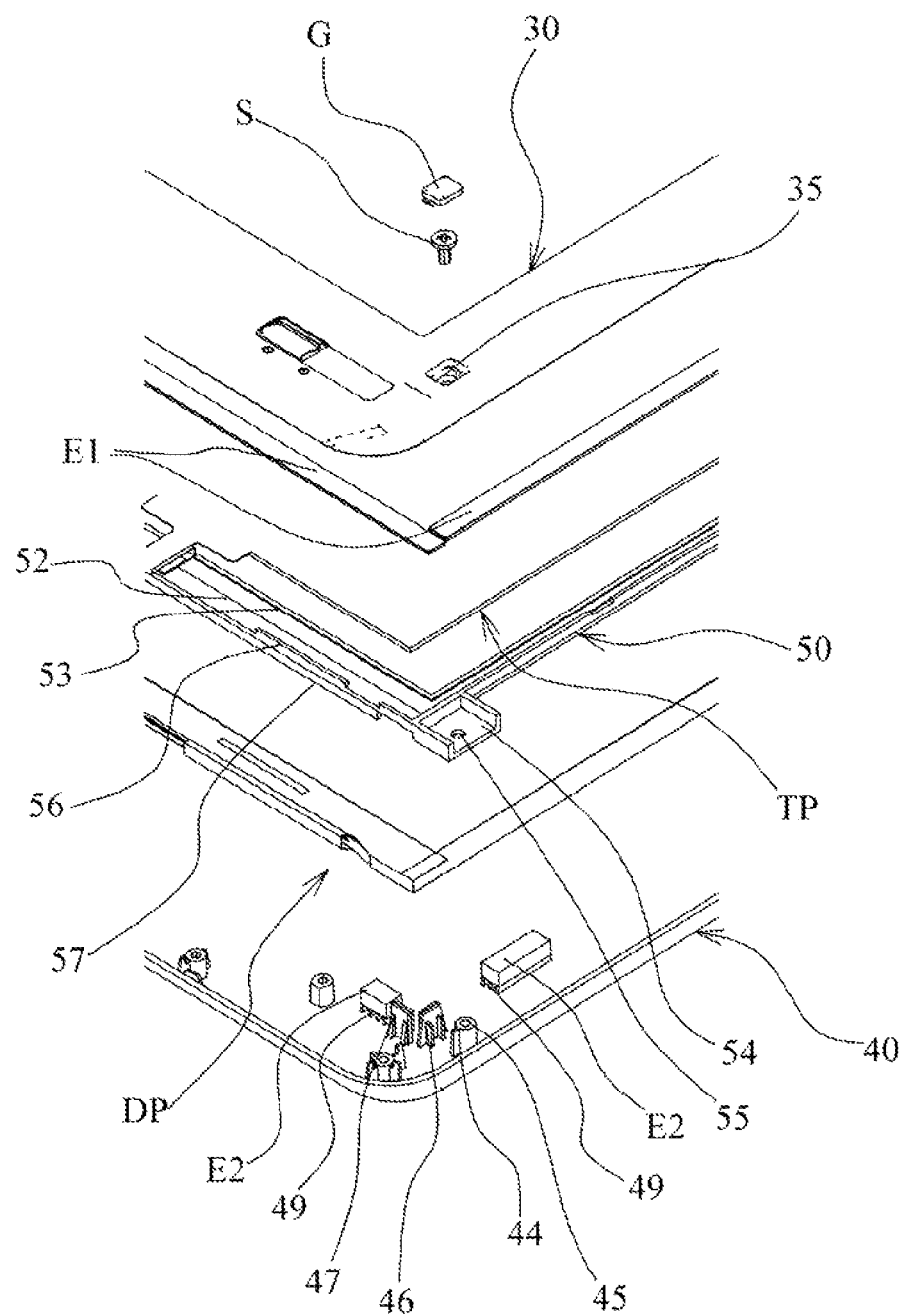
FIG. 5 is an enlarged view of FIG. 4.
Figure 6:
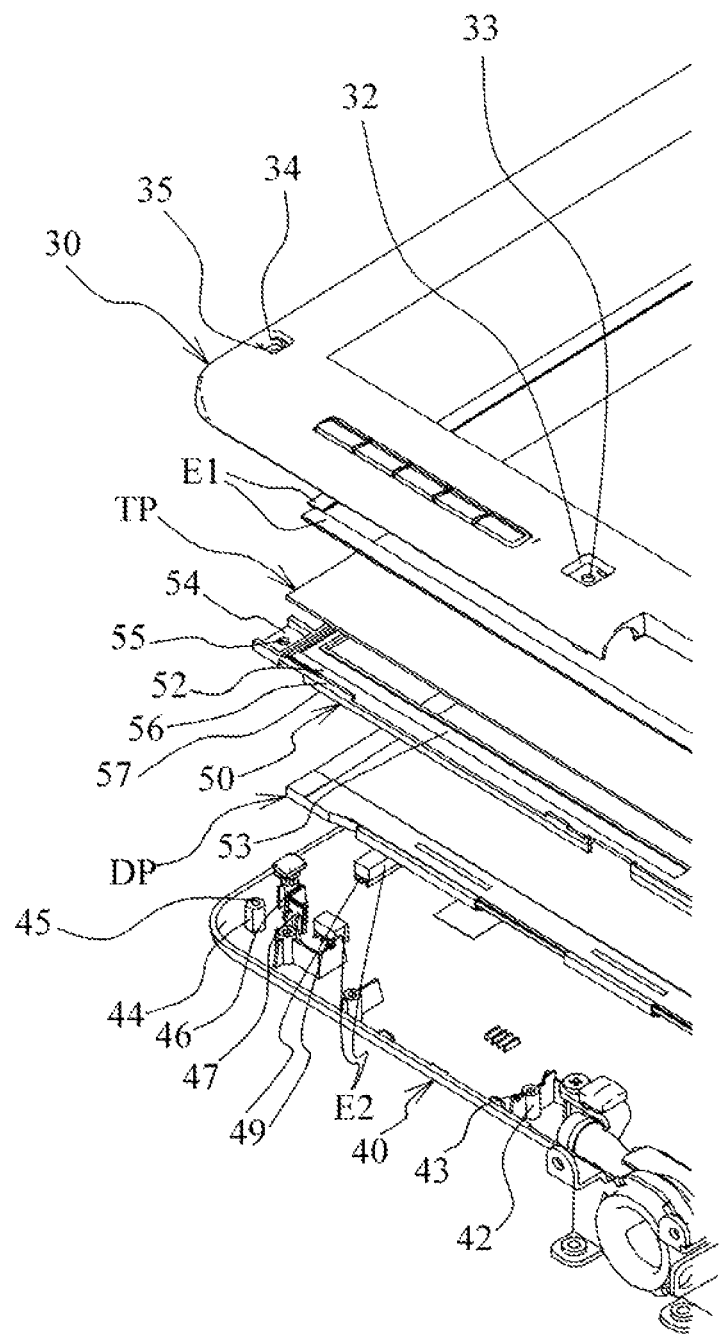
FIG. 6 is an enlarged view of FIG. 4.
Figure 7:
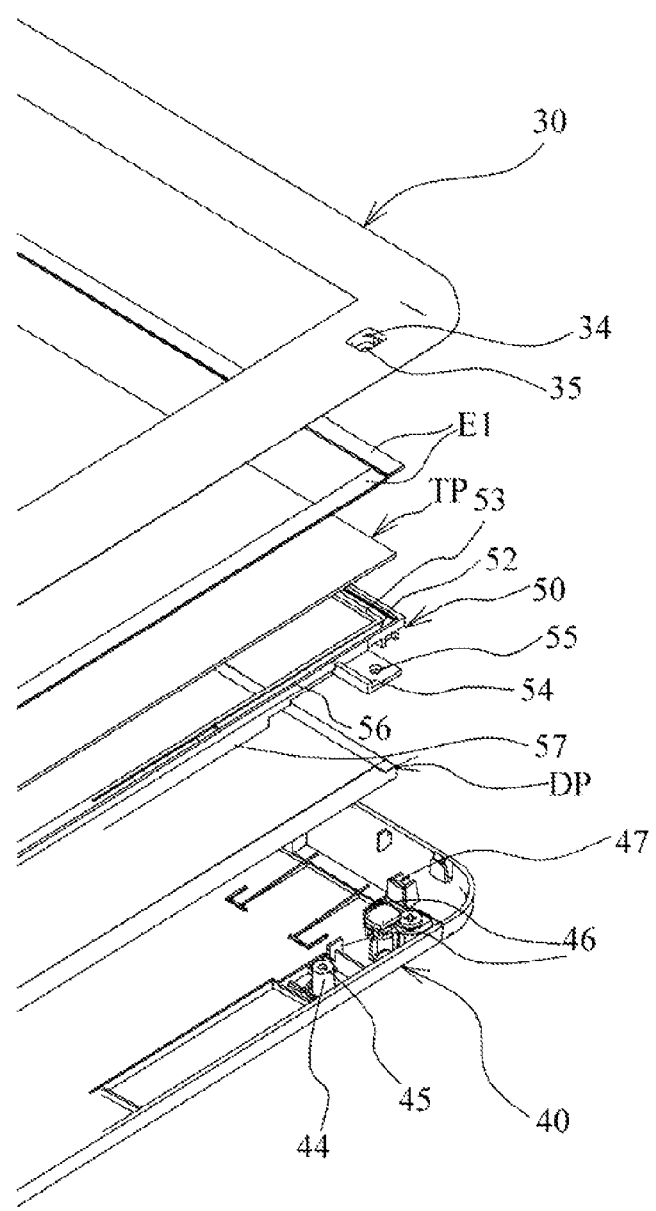
FIG. 7 is an enlarged view of FIG. 4.

FIGS. 5 to 7 are enlarged views of FIG. 4. As illustrated in FIG. 4, the cover 40 is provided with projection pieces 46 and 47 projecting from an inner surface of the cover 40 toward the cover 30 side. The projection pieces 46 and 47 are examples of positioning portions that abut side surfaces of the display panel DP and position the display panel DP in the planer direction thereof. The projection piece 46 abuts one of two opposed short sides of the display panel DP. The projection piece 47 abuts one of two opposed long sides of the display panel DP. Additionally, the projection pieces 46 and 47 are respectively attached with sponges, and abut the display panel DP through the sponges. Other projection pieces 46 and 47 are provided at portions other than the position illustrated in FIGS. 5 to 7. The cover 40 is also provided with support portions 42 and 44 projecting toward the cover 30 side. The support portions 42 and 44 are respectively formed with threaded holes 43 and 45.

The recess portions 32 and 34 are respectively formed with through holes 33 and 35. At least one of plural screws S threadedly engages the threaded hole 43 formed in the support portion 42 of the cover 40 by penetrating through the through hole 33 formed in the recess portion 32. This secures the covers 30 and 40. Also, at least one of plural screws S threadedly engages the threaded hole 45 formed in the support portion 44 of the cover 40 by penetrating through the through holes 35 of the cover 30 and through hole 55 of the holding member 50. This couples the covers 30 and 40 and the holding member 50. The holding member 50 is provided at the base portion 52 with a projection portion 56 projecting toward the cover 30 side, a projection portion 57 projecting toward the cover 40, and a support portion 53 projecting toward an inner side of the holding member 50. The projection portion 56 is formed along an edge of the base portion 52. The projection portion 57 is partially formed along an edge of the base portion 52.

A description will be given of an assembling order of the chassis 20. A worker arranges the display panel DP on the sponges E2 attached on the cover 40 such that the display panel DP is positioned by the projection pieces 46 and 47 of the cover 40. The projection pieces 46 and 47 enables the display panel DP to be arranged easily at the desired position in the cover 40. Next, the worker assembles the holding member 50 holding the touch panel TP into the display panel DP. Specifically, the worker causes the projection portion 57 of the holding member 50 to engage the display panel DP. Next, the worker arranges the cover 30 attached with the sponges E1 to overlap the cover 40, and then secures the covers 30 and 40 and the holding member 50 by the screws S. Next, the worker inserts the rubbers G into the recess portions 32 and 34, respectively. The chassis 20 is assembled in this way.

Figure 8A:
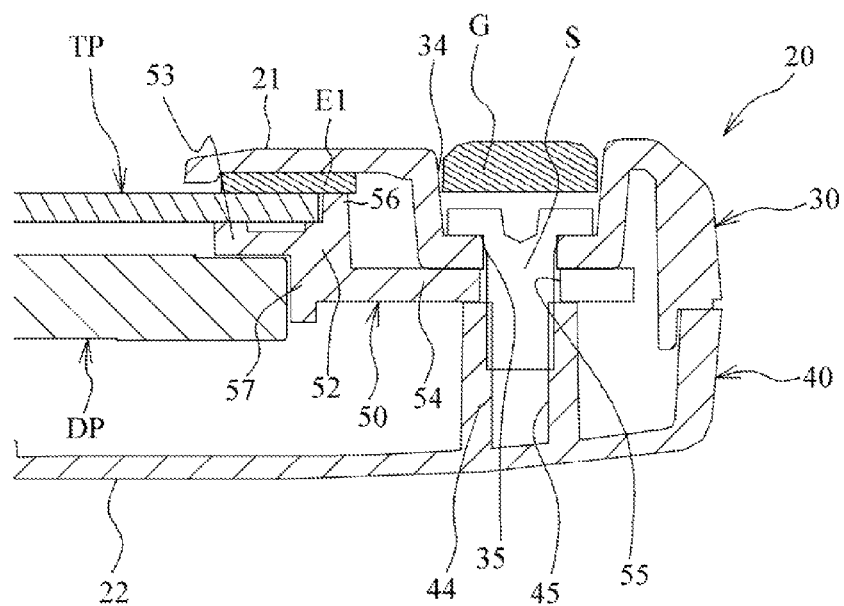
FIGS. 8A and 8B are sectional views of the assembled chassis.
Figure 8B:
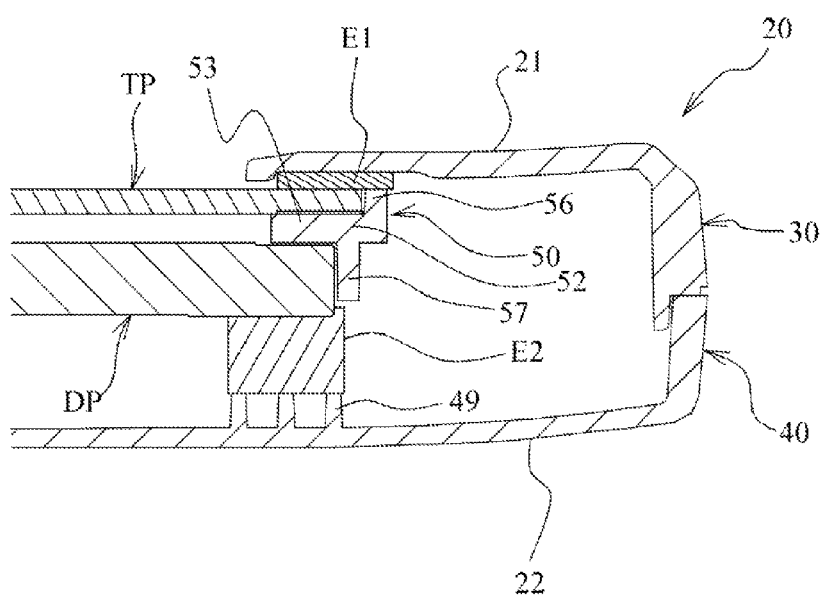

FIGS. 8A and 8B are sectional views of the assembled chassis 20. FIG. 8A is a sectional view illustrating the projection portion 54 of the holding member 50. FIG. 8B is a sectional view illustrating the sponge E2. Referring to FIGS. 8A and 8B, the projection portions 56 and 57 abut and engage the edges of the touch panel TP and the display panel DP, respectively. The projection portions 56 and 57 are examples of positioning portions that position the touch panel TP and the display panel DP. The support portion 53 is located between the touch panel TP and the display panel DP. The support portion 53 is an example of a spacer portion defining a clearance between the touch panel TP and the display panel DP. The touch panel TP is held by the holding member 50 by being supported by the support portion 53 thereof and engaging the projection portions 56 and 57.

The screw S illustrated in FIG. 8A secures the covers 30 and 40, and the holding member 50 together. The screw S illustrated in FIG. 8A is an example of a common part securing the covers 30 and 40, and the holding member 50 together. The projection portion 54 of the holding member 50 is held so as to be sandwiched between the recess portions 34 of the cover 30 and the support member 44 of the cover 40. Therefore, the holding member 50 is positionally defined in the planar direction and the thickness direction of the chassis 20, and is secured thereto.

As illustrated in FIG. 8A, the touch panel TP is held between the cover 30 and the holding member 50. Specifically, an end of the projection portion 56 and the touch panel TP are pushed to the sponge E1. This prevents dusts from entering a gap between the cover 30 and the touch panel TP.

As illustrated in FIG. 8B, the sponge E2 is supported by a rib 49 slightly protruding from the inner side of the cover 40. The sponge E2 is deformed and crushed by the display panel DP. This is because the holding member 50 pushes the display panel DP toward the sponge E2. Thus, the display panel DP is applied with a pressure force of the holding member 50 and an elastic repulsive force of the sponge E2 in a direction opposite to the pressure force. This prevents the display panel DP from chattering between the sponge E2 and the holding member 50. As mentioned above, the holding member 50 pushes and secures the display panel DP to the cover 40 with holding the touch panel TP.

Figure 9:
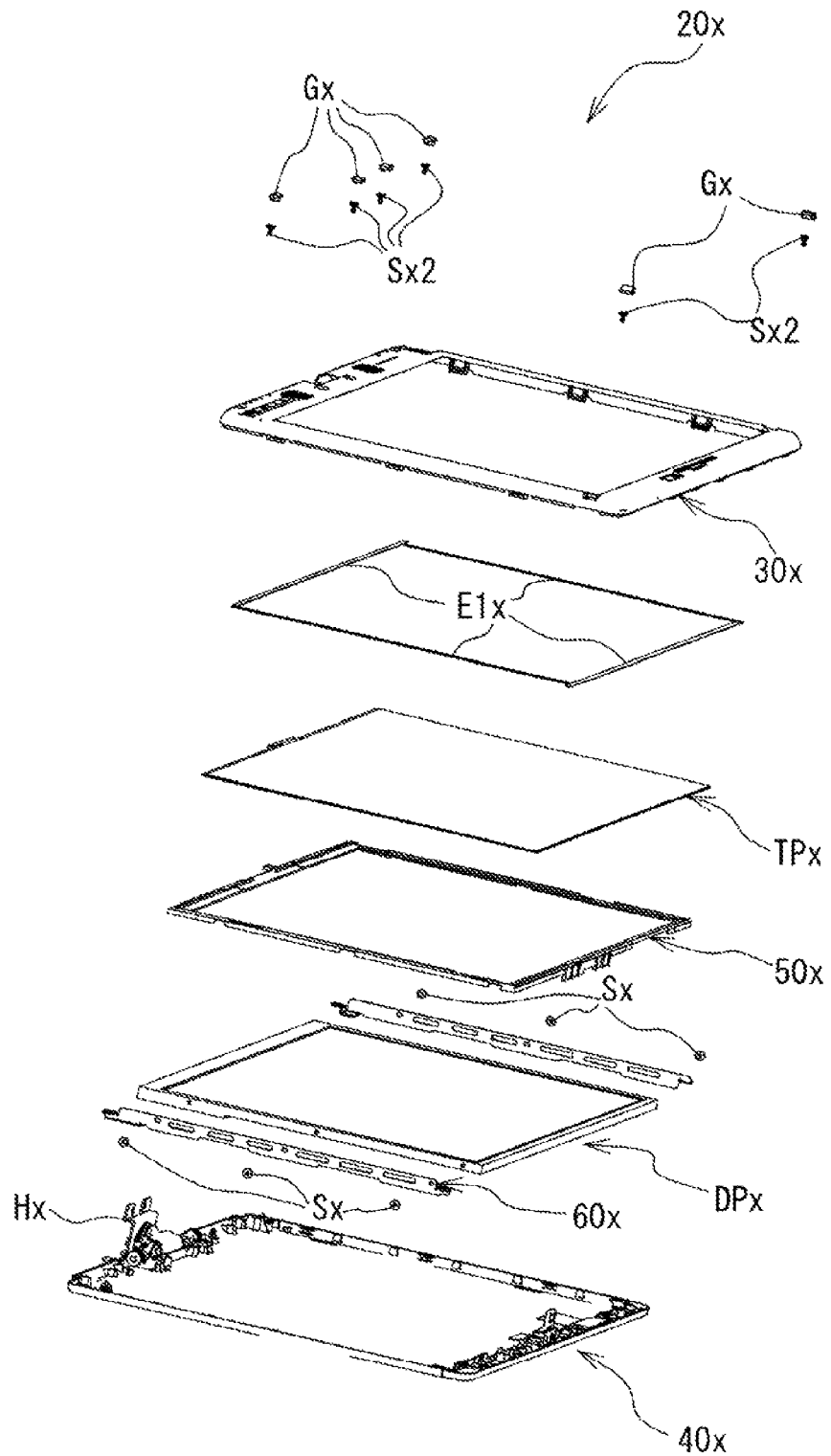
FIG. 9 is an exploded perspective view of a chassis having a structure different from the chassis according to the present embodiment.

FIG. 9 is an exploded perspective view of a chassis 20x having a structure different from the chassis 20 according to the present embodiment. Additionally, similar components of the chassis 20x as those of the chassis 20 are designated with similar reference numerals and a description of those components will be omitted. The chassis 20x includes two securing members 60x secured to a display panel DPx. The securing member 60x has a plate shape extending along an edge of the display panel DPx. The securing member 60x is made of metal. Unlike the holding member 50, a holding member 50x is not provided with the through holes 55.

A description will be given of an assembling order of the chassis 20x. A worker secures the securing members 60x to the display panel DPx, and then secures the securing members 60x to a cover 40x. Next, the worker assembles the holding member 50 holding a touch panel TPx into the securing members 60x, and then secures a cover 30x to the cover 40x by screws Sx2. This assembles the chassis 20x. As mentioned above, unlike the holding member 50, the holding member 50x is not provided with the through holes 55. Thus, the screws Sx2 secure the covers 30x and 40x to each other.

Figure 10:
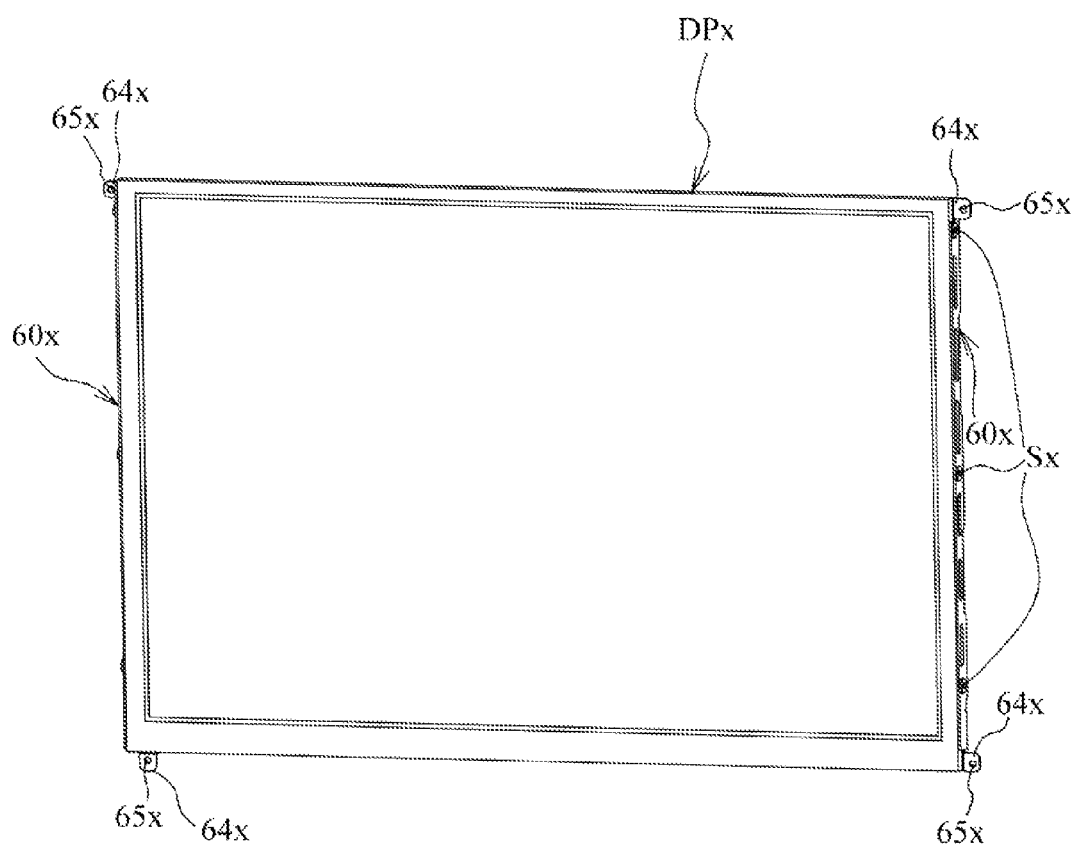
FIG. 10 is an external view of a display panel to which securing members are secured.

FIG. 10 is an external view of the display panel DPx to which the securing members 60x are secured. The two securing members 60x are secured to the display panel DPx by the screws Sx. The securing member 60x is provided with projection portions 64x projecting to the outside of the display panel DPx. A through hole 65x is formed in the projection portion 64x.

Figure 11A:
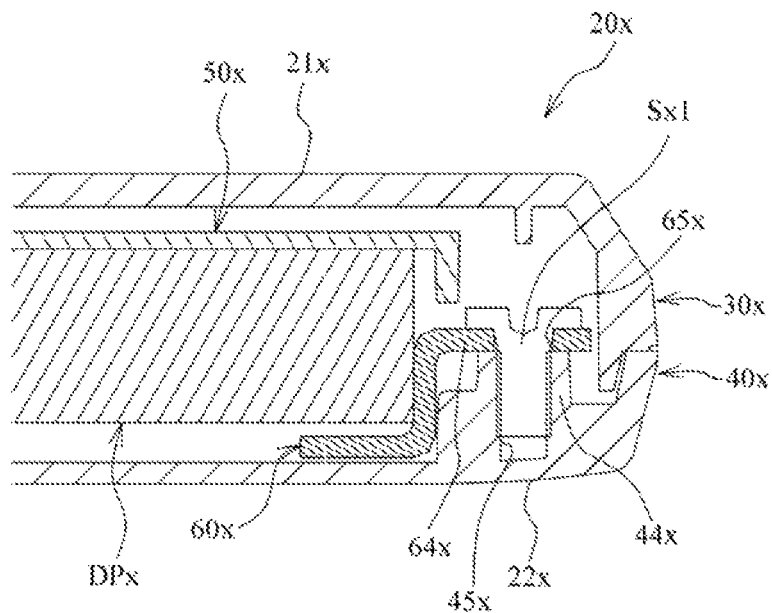
FIGS. 11A and 11B are sectional views of the chassis having the structure different from the chassis according to the present embodiment.
Figure 11B:
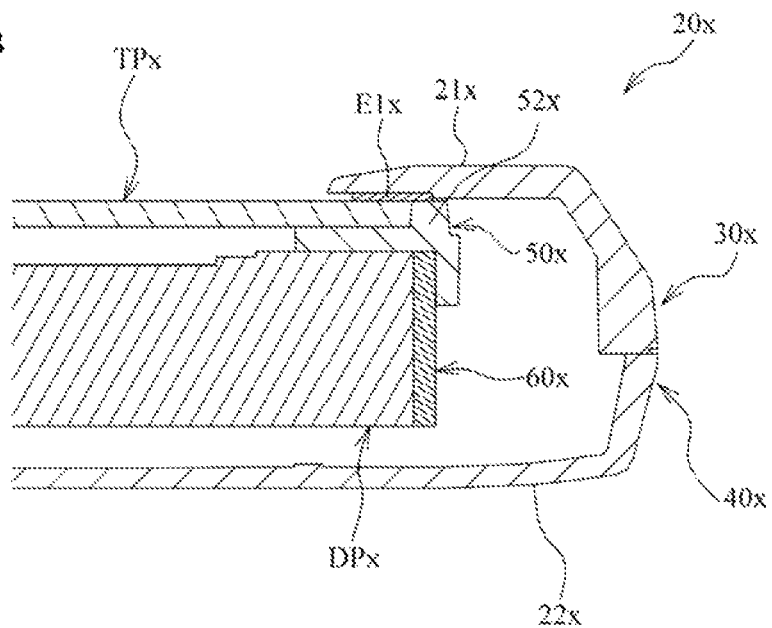

FIGS. 11A and 11B are sectional views of the chassis 20x having the structure different from the chassis 20 according to the present embodiment. As illustrated in FIG. 11A, the screw Sx1 threadedly engages a threaded hole 45x formed in a support portion 44x of the cover 40x by penetrating through a through hole 65x of the projection portion 64x, whereby the securing member 60x is secured to the cover 40x. As illustrated in FIG. 11B, the holding member 50x holds the touch panel TPx and engages the display panel DPx to which the securing member 60x is secured. In this manner, the chassis 20x uses the holding member 50x for holding the touch panel TPx, and the securing members 60x for securing the display panel DPx to the cover 40x.

In the chassis 20 of the notebook computer 1 according to the present embodiment, the holding member 50 holds the touch panel TP and secures the display panel DP to the cover 40. Thus, the chassis 20 of the notebook computer 1 according to the present embodiment eliminates the securing members 60x. For this reason, the weight of the chassis 20 is reduced and the number of the assembling steps thereof is also reduced as compared with the chassis 20x.

As for the chassis 20x, the worker has to secure the securing members 60x to the display panel DPx by the screws Sx, and then has to further secure the securing members 60x to the cover 40x by the screws Sx1. As for the chassis 20 according to the present embodiment, the worker has only to arrange the display panel DP on the cover 40, and then has only to securing the holding member 50 to the covers 30 and 40 by the screws S, thereby securing the display panel DP. For this reason, the number of screws used in the chassis 20 is reduced as compared with the chassis 20x. Thus, the chassis 20 has a light weight and an improved assembling property.

In the chassis 20x, the securing members 60x are secured to the cover 40x by the screws Sx1, and the covers 30x and 40x are secured to each other by the screws Sx2. In the chassis 20 according to the present embodiment, the covers 30 and 40 and the holding member 50 are secured together by common screws S. For this reason, the number of screws used in the chassis 20 is reduced as compared with the chassis 20x. Thus, the chassis 20 has a light weight and an improved assembling property. Additionally, the covers 30 and 40 and the holding member 50 may be secured together by a pin, instead of the screw S, capable of press fitting into holes that are respectively formed in the covers 30 and 40 and the holding member 50.

A rubber or a spring may be used instead of the sponge E2. The spring may have a coil shape or a flat plate shape. Additionally, the use of the sponge E2 instead of a spring or a rubber achieves the reduced weight.

The above embodiment has described the notebook computer as an example of the electronic device. However, the electronic device may be not limited to that. For example, the electronic device may be a tablet computer, a mobile telephone, a mobile television, an electronic dictionary, a PDA, a gaming machine, a camera, a music player, or a navigation. Also, the electronic device may be not only such a portable device but also a stationary electronic device. For example, the electronic device may be a monitor used for a desktop computer, a monitor in which a computer is installed, a television, an audio, or another electrical appliance.

All examples and conditional language recited herein are intended for pedagogical purposes to aid the reader in understanding the invention and the concepts contributed by the inventor to furthering the art, and are to be constructed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the sprit and scope of the invention.

What is claimed is:

1. An electronic device comprising:
a chassis including first and second covers that are opposite to each other;
an input device and a display panel that are arranged within the chassis;
an elastic member that is arranged between the chassis and the display panel and that abuts a rear surface of the display panel;
a rib that protrudes from an inner side of the second cover and that supports the rear surface of the display panel through the elastic member; and
a holding member that includes a base portion, a projection portion extending to an outside of the base portion, and a spacer portion defining a clearance between the input device and the display panel, that holds the input device, that is secured to the first cover and the second cover by a common part at the projection portion, and that pushes the display panel toward the elastic member to deform the elastic member, wherein
the projection portion is located closer to the second cover than the spacer portion.

2. The electronic device of claim 1, wherein the chassis comprises a positioning portion that positions the display panel in a plane direction of the display panel.

3. The electronic device of claim 1, wherein the elastic member comprises at least one of a foam member, a rubber, and a spring.

4. The electronic device of claim 1, wherein the input device is a touch panel.

5. The electronic device of claim 1, wherein the holding member includes a first projection portion abutting an edge of the input device and protruding from the base portion, and a second projection portion abutting an edge of the display panel and protruding from the base portion in a direction opposite to a direction in which the first projection portion protrudes.

* * * * *